United States Patent [19]
Saito et al.

[11] 4,231,650
[45] Nov. 4, 1980

[54] BLADE TYPE FOCAL PLANE SHUTTER

[75] Inventors: Toshihisa Saito, Tokyo; Nobuyoshi Inoue, Kawagoe, both of Japan

[73] Assignee: Copal Company Limited, Tokyo, Japan

[21] Appl. No.: 969,413

[22] Filed: Dec. 14, 1978

[30] Foreign Application Priority Data

Dec. 15, 1977 [JP] Japan .................. 52-168770[U]

[51] Int. Cl.³ .............................................. G03B 9/40
[52] U.S. Cl. ................................. 354/246; 354/252
[58] Field of Search .......................... 354/245, 252

[56] References Cited

U.S. PATENT DOCUMENTS

| | | | |
|---|---|---|---|
| 2,533,450 | 12/1950 | Fuerst | 354/252 |
| 3,646,870 | 3/1972 | Koleff et al. | 354/252 |
| 3,840,885 | 10/1974 | Yoshizaki | 354/252 X |
| 3,946,413 | 3/1976 | Onda et al. | 354/252 X |
| 4,054,891 | 10/1977 | Onda et al. | 354/246 |
| 4,109,266 | 8/1978 | Inoue | 354/246 |
| 4,110,772 | 8/1978 | Nakagawa et al. | 354/246 |

Primary Examiner—L. T. Hix
Assistant Examiner—Thomas H. Tarcza
Attorney, Agent, or Firm—Cushman, Darby & Cushman

[57] ABSTRACT

A blade type focal plane shutter wherein an auxiliary arm is always biased with a spring so that backlashes at pivotably connecting points between a driving arm and shutter blades and between the auxiliary arm and shutter blades may not have a bad influence on the shutter opening and closing motions. This focal plane shutter is provided with a braking lever which can catch a closing driving lever to prevent a bound from being caused when the motion of the shutter blades for exposure ends.

8 Claims, 6 Drawing Figures

BLADE TYPE FOCAL PLANE SHUTTER

BACKGROUND OF THE INVENTION (a) Field of the Invention

This invention relates to focal plane shutters for photographic cameras and more particularly to improvements in a focal plane shutter wherein shutter blades consist of a plurality of opaque thin plates.

(b) Description of the Prior Art

In a focal plane shutter of a type wherein shutter blades consist of a plurality of opaque thin plates, such opaque thin plates are pivotally supported on a pair of arms rotatably supported respectively at one end on a shutter base plate so that, when these opaque thin plates are folded or unfolded just before an exposure aperture by the rotation of the pair of arms, the exposure aperture may be opened or closed. One of the arms of the pair is pin-slot-connected with a driving member biased by a driving spring so that the pair of arms may be rotated by this driving member. As described above, in this kind of focal plane shutter, the opaque thin plates are pivotally connected with the arms and one of the arms is connected in a pin-slot type with the driving member. Therefore, backlashes are always present at such connecting points. When the shutter is cocked, these backlashes will fluctuate the stationary positions of the opaque thin plates. Such fluctuation will have an undesirable influence on the performance of the shutter and will make it impossible to accurately control the exposure time.

Under such circumstances, in this field, a very high precision is required in working component parts or particularly pins, holes and slots. Therefore, the passing rate of parts in the mass-production is low, a high skill is required in assembling parts and therefore the production cost of products can not help becoming high.

Further, in this kind of focal plane shutter, many comparatively thin small parts are used and therefore the parts are likely to be deformed or broken by a shock or bound at the time of the end of the motion. Therefore, many cushioning devices and bound preventing devices have been already suggested but have functional defects.

SUMMARY OF THE INVENTION

Therefore, a primary object of the present invention is to eliminate the above mentioned defects in this kind of focal plane shutter.

Another object of the present invention is to provide this kind of focal plane shutter which can retain excellent performances without requiring a high working precision of component parts.

According to the present invention, these objects are attained by biasing one or both of a pair of arms with a spring.

According to a preferred formation of the present invention, there is provided a braking lever to catch a closing blade driving member when it moves from the cocked position to the uncocked position to end exposure. This braking lever is disengaged from the closing blade driving member in the initial step of the cocking operation.

These and other objects of the present invention will become more apparent during the course of the following detailed description and appended claims.

DESCRIPTION OF THE PREFERRED EMBODIMENTS

Figure 1:
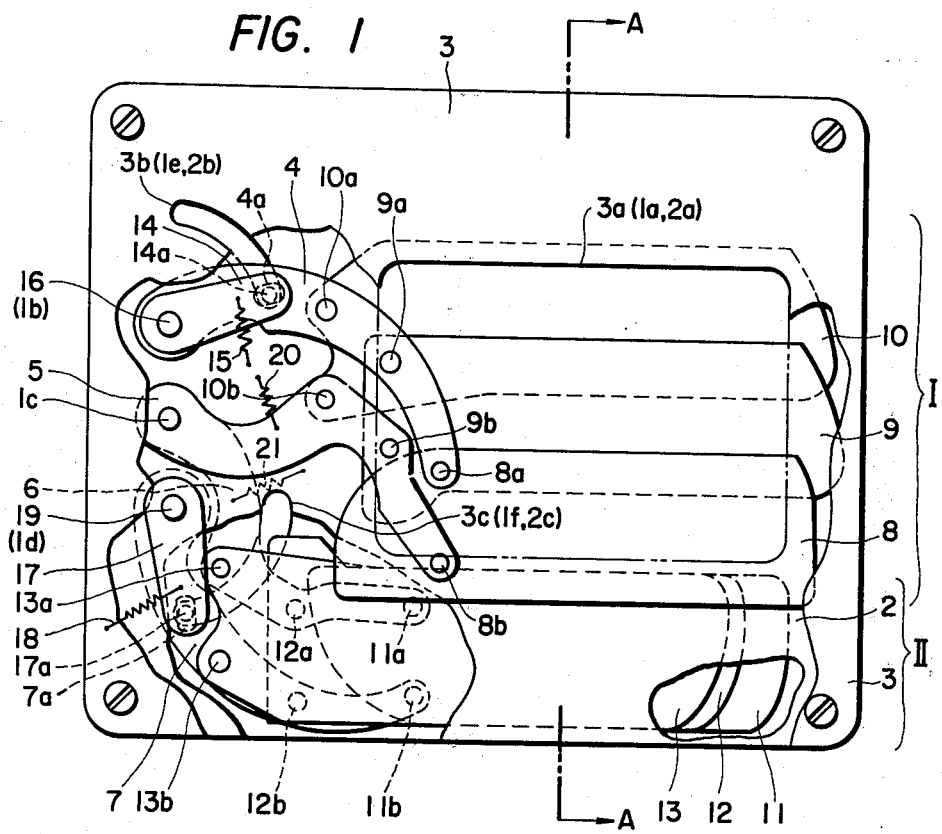
FIG. 1 is an elevational view of an essential part of a focal plane shutter embodying the present invention in which the shutter is uncocked.
Figure 2:
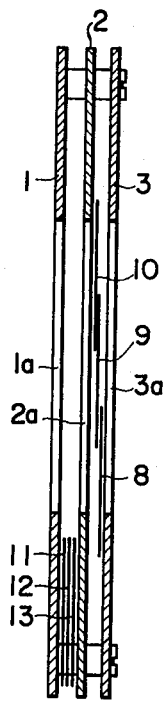
FIG. 2 is a sectional view along line A—A in FIG. 1.

First, with reference to FIGS. 1 and 2, reference numeral 1 indicates a base plate having an exposure aperture 1a, shafts 1b, 1c and 1d and arcuate slots 1e and 1f. 2 indicates a partition plate secured to the base plate 1 and having an exposure aperture 2a aligned with the exposure aperture 1a and arcuate slots 2b and 2c aligned respectively with the arcuate slots 1e and 1f. 3 indicates a cover plate secured to the partition plate 2 and having an exposure aperture 3a aligned with the exposure apertures 1a and 2a and arcuate slots aligned respectively with the arcuate slots 1e, 2b and 1f, 2c. 4 indicates a closing driving arm supported rotatably on the base plate 1 by the shaft 1b and having a slot 4a. 5 indicates a closing auxiliary arm supported rotatably on the base plate 1 by the shaft 1c. 6 indicates an opening auxiliary arm supported rotatably on the base plate 1 by the shaft 1c. 7 indicates an opening drive arm supported rotatably on the base plate 1 by the shaft 1d and having a slot 7a. Reference numerals 8, 9 and 10 indicate opaque thin plates pivotably connected on the closing driving arm 4 and closing auxiliary arm 5 respectively by shafts 8a, 8b; 9a, 9b; 10a, 10b and forming shutter closing blades I. In the drawing, the closing blades I are unfolded to cover the exposure apertures 1a, 2a and 3a. Reference numerals 11, 12 and 13 indicate opaque thin plates pivotably connected on the opening auxiliary arm 6 and opening driving arm 7 respectively by shafts 11a, 11b; 12a, 12b; 13a, 13b and forming shutter opening blades II. In the drawing, the opening blades II are folded to open the exposure apertures 1a, 2a and 3a. 14 indicates a closing driving lever supported rotatably on a shaft 16 coaxial with the shaft 1b, having a pin 14a fitted in the slot 4a of the closing driving arm 4 and biased clockwise by a closing driving spring 15. 17 indicates an opening driving lever supported rotatably on a shaft 19 coaxial with the shaft 1d, having a pin 17a fitted in the slot 7a of the opening driving arm 7 and biased clockwise by an opening drive spring 18. 20 and 21 indicate springs for biasing counterclockwise respectively the closing auxiliary lever 5 and opening auxiliary lever 6. The pin 14a of the closing driving lever 14 and the pin 17a of the opening driving lever 17 extend through the cover plate 3, partition plate 2 and base plate 1 and move respectively within the arcuate slots 1e, 1f; 2b, 2c; 3b, 3c. By the way, the distance between the shafts 1b and 1c is selected to be equal to each of the distances between the shafts 8a and 8b, between the shafts 9a and 9b and between the shafts 10a and 10b. The distances from the shaft 1b to the shafts 8a, 9a and 10a are set to be equal respectively to the distances from the shaft 1c to the shafts 8b, 9b and 10b. Therefore, the closing blades I make a pantograph motion having the line segment connecting the shafts 1b and 1c as a fixed side. The opening blades II are arranged so as to be in a mirror image relation with the closing blades I and make the same operation. That is to say, they will be folded when the closing blades I are unfolded but will be unfolded when the closing blades I are folded. The thin plate 8 is pivotably connected so as to be placed directly on the arms 4 and 5. The other thin plates 9 and 10 are pivotably connected so as to be stacked in turn on the thin plate 8. In the same manner, the thin plate 11 is pivotably connected so as to be placed directly on the arms 6 and 7 and the other thin plates 12 and 13 are pivotably connected so as to be stacked in turn on the thin plate 11. The thin plates 8 and 11 serve to form an exposure slit.

The operation of the above mentioned shutter shall be explained in the following.

FIG. 1 shows a state in which exposure has ended, that is, an uncocked state. If the shutter is cocked in association with winding up the film, the closing driving lever 14 and opening driving lever 17 will be simultaneously counterclockwise rotated to tension respectively the closing driving spring 15 and opening driving spring 18. During this motion, the closing blades I will be folded in turn while rising and the opening blades II will be unfolded in turn while rising to cover the exposure apertures. Therefore, meanwhile, the exposure apertures will not be substantially opened. Further, during this motion, the closing auxiliary arm 5 and opening auxiliary arm 6 will continue to be biased counterclockwise respectively by the springs 20 and 21. Therefore, the thin plates 8, 9 and 10 will be pushed toward the closing drive arm 4. As a result, an edge of the slot 4a will be pushed against the outer peripheral surface of the pin 14a. This phenomenon occurs the same also with the opening blades II. That is to say, the thin plates 11, 12 and 13 will be all pushed toward the opposite side of the driving arm 7 and an edge of the slot 7a will be pushed against the outer peripheral surface of the pin 17a as a result. When the cocking operation is thus completed, the closing driving lever 14 and opening driving lever 17 will be locked respectively in the counterclockwise positions by locking means not illustrated.

If the shutter is released in this state, first the opening driving lever 17 will be released to quickly rotate clockwise and the opening blades II will immediately open the exposure apertures 1a, 2a and 3a. In this case, the biasing spring 21 will be far weaker than the opening driving spring 18 and will not obstruct the motions of the opening driving lever 17 and arms 6 and 7. When the exposure is thus started and a proper exposure time elapses, the closing driving lever 14 will be released. In this case, too, the same as in the case of the opening blades II, the closing blades I will immediately operate to close the exposure apertures 1a, 2a and 3a, one exposure operation will be completed and all the elements will return to be in the state shown in FIG. 1.

As evident from the above description, the backlash present between the slot 4a and pin 14a and the backlashes present at the respective pivotably connecting points (8a, 8b; 9a, 9b; 10a, 10b,) of the closing driving arm 4 and closing auxiliary arm 5 with the thin plates 8, 9 and 10 will be all absorbed by the spring 20, the backlash between the slot 7a and pin 17a and the backlashes present at the respective pivotably connecting points (11a, 11b; 12a, 12b; 13a, 13b,) of the opening drive arm 7 and opening auxiliary arm 6 with the thin plates 11, 12 and 13 will be all absorbed by the spring 21, therefore the respective thin plates will be always held in fixed positions and the opening blades I and closing blades II will always smoothly and accurately operate as a result. These advantages will be obtained the same even if only either of the closing driving arm 4 and opening driving arm 7 is biased by the spring. Further, even if the biasing direction of the springs 20 and 21 is reverse to the direction in the illustrated embodiment, the same effect will be able to be obtained. The presence of the biasing springs 20 and 21 means that, even if parts rough in the working precision of component parts, that is, shafts and holes are used, this kind of shutter of high performances will be obtained.

Another embodiment of the present invention shall be explained with reference to FIGS. 3 to 6 in the following. This embodiment is different from the embodiment in FIG. 1 in respect that the closing blades I and opening blades II are formed respectively of five opaque thin plates, that the closing auxiliary arm and opening auxiliary arm are supported on respectively different shafts and that it is formed so that the state shown in FIG. 3 may be a cocked state. However, the fundamental formation is the same as in FIG. 1. Therefore, the same reference numerals shall be only attached to the respective same or similar parts and portions and the detailed explanation of duplicated parts shall be omitted.

Figure 4:
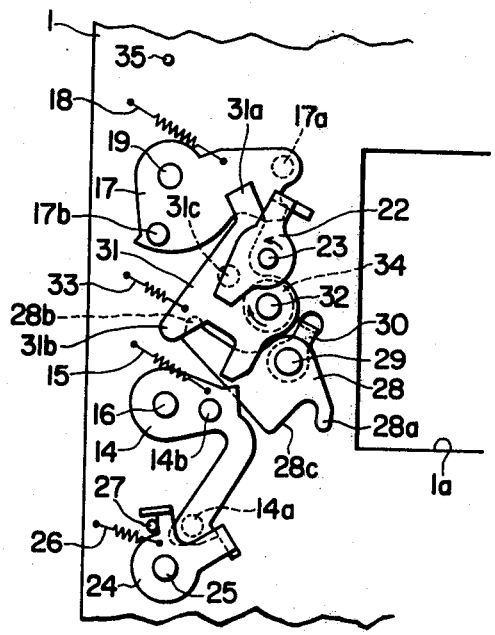
FIG. 4 is an elevational view of a driving mechanism of the focal plane shutter shown in FIG. 3.
Figure 5:
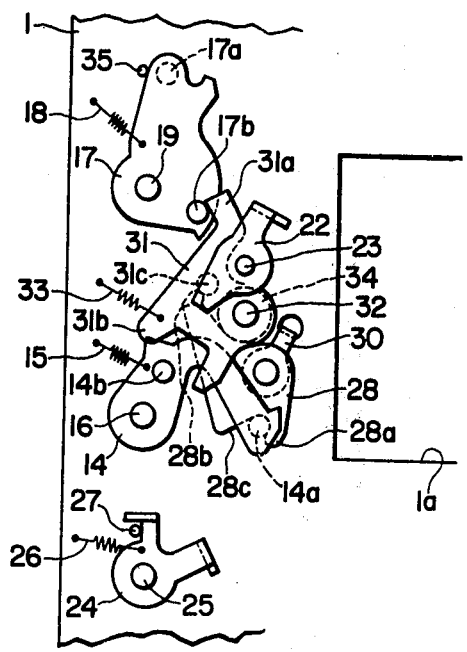
FIG. 5 is an elevational view of the driving mechanism shown in FIG. 4 in which it is uncocked.
Figure 6:
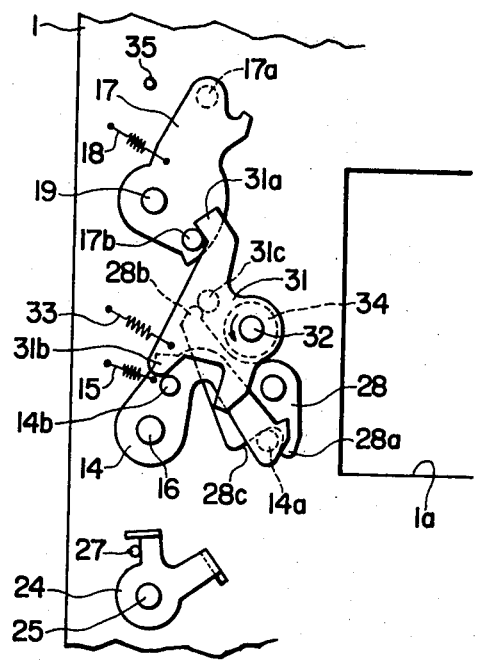
FIG. 6 is a partly omitted elevational view of the driving mechanism shown in FIG. 4 in which it is being cocked.

With reference to FIG. 4, reference numeral 22 indicates an opening blade locking lever supported rotatably on a shaft 23 fixed on the base plate 1 and biased counterclockwise by a spring not illustrated. This locking lever 22 is restricted in the counterclockwise rotation by a stopper pin not illustrated. 24 indicates a closing blade locking lever supported rotatably on a shaft 25 fixed on the base plate 1 and biased counterclockwise by a spring 26. This locking lever 24 is restricted in the counterclockwise rotation by a stopper pin 27. 28 indicates a closing blade braking lever supported rotatably on a shaft 29 fixed on the base plate 1 and having a bound preventing arm 28a, another arm 28b and a side surface 28c. A dish-shaped plate spring 30 is fitted on the shaft 29 between the base plate 1 and braking lever 28 so that the braking lever 28 may be prevented by a strong frictional force between this spring 30 and braking lever 28 from being easily rotated. By the way, the arm 28b is longer than the arm 28a. Reference numeral 31 indicates a blade setting lever supported rotatably on a shaft 32 fixed on the base plate 1, having arms 31a and 31b and a pin 31c and biased clockwise by a spring 33. This lever 31 is restricted in the clockwise rotation by a stopper pin not illustrated. 34 indicates a cushioning member fitted on the shaft 32 between the base plate 1 and setting lever 31. 35 indicates a stopper pin for restricting the counterclockwise rotation of the opening driving arm 17.

The operation of the above mentioned mechanism shall be explained in the following.

Figure 3:
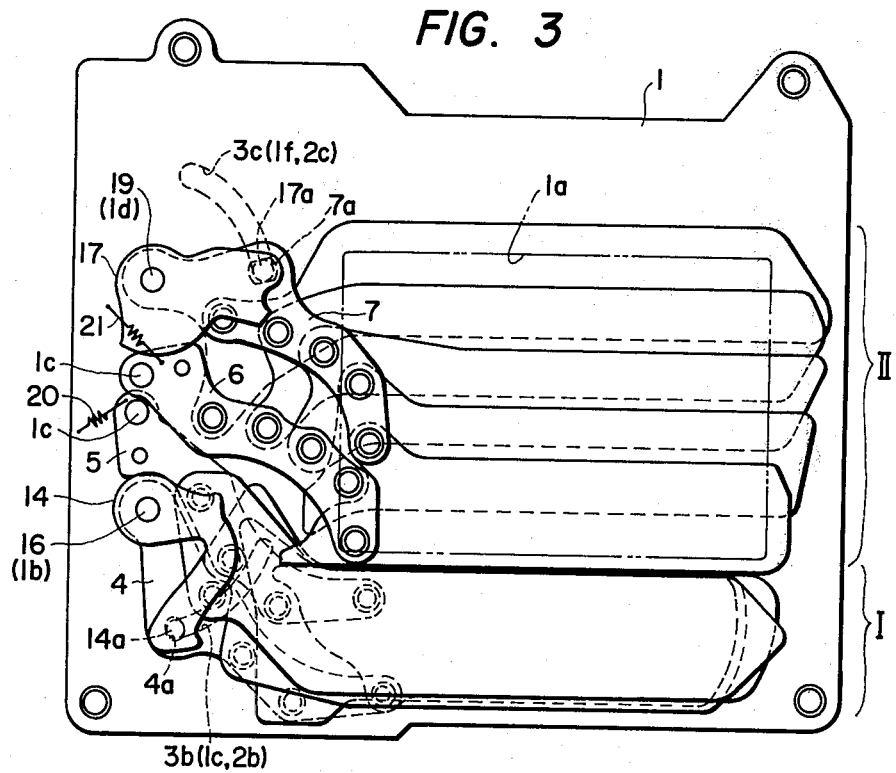
FIG. 3 is an elevational view of an essential part of another focal plane shutter embodying the present invention in which the shutter is cocked.

In the state shown in FIGS. 3 and 4, if a release button not illustrated is pushed down, the opening blade locking lever 22 will be rotated clockwise in association with it to unlock the driving lever 17. Thus, as already explained, the opening blades II will move upward while being folded and will retreat from the exposure apertures 1a, 2a and 3a to begin exposure. When a proper exposure time elapses, the closing blade locking lever 24 will be clockwise rotated by means not illustrated to unlock the closing driving lever 14. Therefore, the closing blade I will move upward while being unfolded to cover the exposure apertures 1a, 2a and 3a and one exposure will be completed. In this case, the closing driving lever 14 will push the side surface 28c of the braking lever 28 through the pin 14a in the final step of the rotation so as to clockwise rotate the braking lever 28. The braking lever 28 will rotate while being subjected to the strong frictional force between the braking lever 28 and plate spring 30 and therefore, in this step, the driving lever 14 will be subjected to a strong braking force as a result. The closing driving lever 14 will be stopped by the collision of the braking lever 28 with the cushioning member 34. The bound when the closing driving lever 14 stops will be reduced by the presence of the cushioning member 34 but some bound will tend to be made. However, in this step, the arm 28a of the braking lever 28 and the pin 14a of the closing driving lever 14 will be engaged with each other and therefore the bound of the closing driving lever 14 will be perfectly prevented (See FIG. 5).

The shutter is cocked by counterclockwise rotating the setting lever 31. That is to say, if the setting lever 31 is rotated counterclockwise, the opening driving lever 17 will be rotated clockwise by the engagement of the arm 31a and pin 17b with each other and the braking lever 28 will be rotated counterclockwise by the engagement of the pin 31c and arm 28b with each other. By this counterclockwise rotation of the braking lever 28, the pin 14a will be freed and the closing drive lever 14 will be made clockwise rotatable. By the continued counterclockwise rotation of the setting lever 31, the arm 31b will be engaged with the pin 14b (See FIG. 6). As a result, the closing driving lever 14 will be rotated clockwise. Thus the cocking operation will be completed. Meanwhile, in the already explained manner, the opening blades II and closing blades I will be again brought to the positions in FIG. 3. As evident by this explanation, the braking lever 28 will be counterclockwise rotated by pushing the comparatively long arm 28b at the tip with the pin 31c instead of pushing the arm 28a with the pin 14a and therefore by a comparatively small force. Therefore, the shutter can be cocked with a comparatively small force as a whole.

This embodiment is so made as to perfectly prevent a bound from being caused when the motion of the closing driving lever 14 stops. However, it is needless to say that the present invention can be applied also to prevent a bound for the opening driving lever 17. Further, the present invention can be applied also to a release controlling mechanism for operating the opening blade locking lever 22 and closing blade locking lever 24 in turn at pre-set time intervals.

As described above, according to the present invention, even if parts worked at a high precision are not used, this kind of focal plane shutter of very high performances will be able to be provided at a low cost.

We claim:

1. A blade type focal plane shutter comprising a base plate having an exposure aperture therein, a driving arm rotatably supported at one end on said base plate and able to move between its cocked position and its uncocked position, an auxiliary arm rotatably supported at one end on said base plate at a distance from said driving arm and able to move between its cocked position and its uncocked position, at least one opague thin plate pivotably supported on said driving arm and auxiliary arm and able to open and close said exposure aperture, and a spring connected between said base plate and said auxiliary arm and able to bias said driving arm and auxiliary arm in one direction to absorb backlashes present at respective pivotably supporting points of said driving arm and auxiliary arm with said opague thin plate.

2. A focal plane shutter according to claim 1 wherein said focal plane shutter further comprises a driving lever supported rotatably on said base plate coaxially with said driving arm and pin-slot-connected with said driving arm, a braking lever supported rotatably on said base plate and engageable with said driving lever and a setting member supported rotatably on said base plate and engageable with said driving lever and braking lever, said driving lever is engaged with said braking lever to prevent said driving lever from bounding just before said driving lever reaches its uncocked position from its cocked position, and said braking lever is rotated to be disengaged from said driving lever by said setting member before said driving lever is rotated toward its cocked position from its uncocked position by said setting member.

3. A focal plane shutter according to claim 2 wherein a plate spring is interposed between said base plate and braking lever to give a strong braking force to said braking lever.

4. A focal plane shutter according to claim 3 wherein a cushioning member capable of contacting said braking lever is interposed between said base plate and setting member.

5. A focal plane shutter according to claim 1 wherein said focal plane shutter further comprises a driving lever rotatably supported on said base plate coaxially with said driving arm and a pin-slot-connected with said driving arm.

6. A blade type focal plane shutter comprising a base plate having an exposure aperture therein, a driving arm supported at one end rotatably on said base plate and able to move between its cocked position and its uncocked position, an auxiliary arm supported at one end rotatably on said base plate at a distance from said driving arm and able to move between its cocked position and its uncocked position, at least one opague thin plate pivotably supported on said driving arm and auxiliary arm and able to open and close said exposure aperture, a spring connected between said base plate and at least one of the driving arm and auxiliary arm and able to bias said driving arm and auxiliary arm in one direction;

a driving lever supported rotatably on said base plate coaxially with said driving arm and the pin-slot-connected with said driving arm, a braking lever supported rotatably on said base plate and engageable with said driving lever and a setting member supported rotatably on said base plate and engageable with said driving lever and braking lever, said driving lever becoming engaged with said braking lever to prevent said driving lever from bounding just before said driving lever reaches its uncocked position from its cocked position, and said braking lever being rotated to be disengaged from said driving lever by said setting member before said driving lever is rotated toward its cocked position from its uncocked position by said setting member.

7. A blade type focal plane shutter comprising a base plate having an exposure aperture therein, a drive arm rotatably supported at one end of said base plate, and movable between cocked and uncocked positions, drive means to drive said drive arm between its cocked and uncocked positions, an auxiliary arm rotatably supported at one end on said base plate at a distance from said drive arm and able to move between cocked and uncocked positions, at least one opague thin plate pivotably supported on said drive and auxiliary arms and able to open and close the exposure aperature, and a spring connected between said base plate and said auxiliary arm for biasing said drive and auxiliary arms in one direction so that backlashes, present at respective pivotably supporting points of said driving arm and auxiliary arm with said opague thin plate, can be absorbed.

8. A focal plane shutter as in claim 7 wherein said one direction is in a direction opposite to the direction of movement created by said drive means.

* * * * *